United States Patent
Baek et al.

(10) Patent No.: US 9,311,642 B2
(45) Date of Patent: Apr. 12, 2016

(54) APPARATUS AND METHOD FOR CREATING COUPON FOR FREE GIFT

(76) Inventors: Seung-Cheol Baek, Incheon (KR); Kee-Pum Lee, Hwasung-si (KR)

(*) Notice: Subject to any disclaimer, the term of this patent is extended or adjusted under 35 U.S.C. 154(b) by 38 days.

(21) Appl. No.: 13/697,449

(22) PCT Filed: Apr. 3, 2012

(86) PCT No.: PCT/KR2012/002489
§ 371 (c)(1),
(2), (4) Date: Nov. 12, 2012

(87) PCT Pub. No.: WO2012/141447
PCT Pub. Date: Oct. 18, 2012

(65) Prior Publication Data
US 2013/0065661 A1   Mar. 14, 2013

(30) Foreign Application Priority Data
Apr. 11, 2011   (KR) .................. 10-2011-0033268

(51) Int. Cl.
*G07C 15/00*   (2006.01)
*G06Q 20/38*   (2012.01)
*G06Q 30/02*   (2012.01)

(52) U.S. Cl.
CPC .............. *G06Q 20/387* (2013.01); *G06Q 30/02* (2013.01); *G06Q 30/0207* (2013.01)

(58) Field of Classification Search
CPC ................................ G07C 15/00; G06F 7/582
USPC ............................................................. 463/17
See application file for complete search history.

(56) References Cited

U.S. PATENT DOCUMENTS

| | | | |
|---|---|---|---|
| 2003/0134672 A1* | 7/2003 | Fulton | 463/17 |
| 2004/0101142 A1* | 5/2004 | Nasypny | 380/278 |
| 2004/0102242 A1* | 5/2004 | Poelmann | 463/22 |
| 2004/0172348 A1* | 9/2004 | Kawamori et al. | 705/31 |
| 2009/0264176 A1* | 10/2009 | Walker et al. | 463/17 |
| 2010/0131342 A1* | 5/2010 | Thibedeau et al. | 705/14.13 |
| 2012/0039469 A1* | 2/2012 | Mueller et al. | 380/252 |

FOREIGN PATENT DOCUMENTS

| | | |
|---|---|---|
| GB | 190517758 A * | 9/1905 |
| KR | 1020040097001 | 11/2004 |
| KR | 1020050091114 | 9/2005 |
| KR | 100791938 | 12/2007 |
| KR | 1020080081877 | 9/2008 |

OTHER PUBLICATIONS

An Essay on Probabilities: and on Their Application of Life Contingencies . . . by Augustus De Morgan, published 1838.*

* cited by examiner

*Primary Examiner* — James S McClellan
*Assistant Examiner* — Syvila Weatherford
(74) *Attorney, Agent, or Firm* — IPLA P.A.; James E. Bame

(57) ABSTRACT

An apparatus and method for creating coupons for free gift presentation is provided, which encrypts an instant coupon number capable of indicating whether the instant coupon number is a winning number while allowing a customer who receives a coupon to immediately check whether he or she has won a free gift using a smart phone or the like.

10 Claims, 4 Drawing Sheets

| | FIRST COLUMN | SECOND COLUMN | THIRD COLUMN | FOURTH COLUMN | 401 |
|---|---|---|---|---|---|
| 1 | XXXX | XXXX | XXXX | XXXX | → FIRST WINNING NUMBER |
| 2 | XXXX | XXXX | XXXX | XXXX | → SECOND WINNING NUMBER |
| 3 | XXXX | XXXX | XXXX | XXXX | → THIRD WINNING NUMBER |
| 4 | XXXX | XXXX | XXXX | XXXX | → FOURTH WINNING NUMBER |
| ⋮ | | | | | |
| 5040 | XXXX | XXXX | XXXX | XXXX | → 5040TH WINNING NUMBER |

APPARATUS AND METHOD FOR CREATING COUPON FOR FREE GIFT

BACKGROUND OF THE INVENTION

The present invention relates, in general, to an apparatus and method for creating coupons for free gift presentation and, more particularly, to an apparatus and method for creating coupons for free gift presentation, which allow a customer who receives a coupon, on which an encrypted instant coupon number capable of indicating whether the instant coupon number is a winning number is printed, to immediately check whether he or she has won a free gift using a smart phone or the like.

Generally, as a type of marketing, free gifts are directly provided when products are purchased, or are provided using various types of coupons so as to prompt customers to purchase products. Typically, a free gift means that another product is provided free or at a low price to persons who purchased a certain product for a predetermined period of time. Such a free gift is used as a means for constructing a customer database (DB) and contributes to the improvement of the image of a brand.

However, marketing that presents free gifts, gift cards, and complimentary tickets using coupons, rather than marketing that provides free gifts when customer purchase products, has been mainly used so as to achieve publicity effects, prompt the purchase of products, and collect customer information. Typically, on coupons for free gift presentation, coupon numbers are printed, and methods of presenting free gifts are mainly implemented as an unconditional presentation method of receiving the coupon number of a relevant coupon from a coupon user who accesses the corresponding site using a computer or the like, registering the coupon number, and then providing a free gift, and a winning method of providing a free gift only when an input coupon number is a winning coupon number.

Therefore, the latter case has inconvenience in that a coupon user must personally access the site of a company that provides coupons using a computer each time, individually enter coupon numbers printed on coupons, and then check whether he or she has a winning coupon number.

Further, conventional coupons are problematic in that coupon numbers are printed to allow anyone to easily view coupon numbers printed on the coupons, thus causing the coupon numbers to be easily exposed to a third party. Accordingly, there is a problem in that a third party who views the coupon number of the coupon can register the coupon number and receive a free gift before the actual coupon user does.

SUMMARY OF THE INVENTION

Accordingly, the present invention has been made keeping in mind the above problems occurring in the prior art, and an object of the present invention is to provide an apparatus and method for creating coupons for free gift presentation, which allow a customer who receives a coupon, on which an encrypted instant coupon number capable of indicating whether the instant coupon number is a winning number is printed, to immediately check whether he or she has won a free gift using a smart phone or the like.

An apparatus for creating coupons for free gift presentation according to the present invention to accomplish the above object includes a winning reference number generation unit for generating winning reference numbers, in which group numbers, each including a plurality of different one-digit numbers, indicate a plurality of groups, a winning reference number storage unit for storing the generated winning reference numbers, a coupon number generation unit for loading each of the stored winning reference numbers, and generating coupon numbers including both winning numbers, generated using one of group numbers of the loaded winning reference number, and winning group information having information about the group number, a coupon number storage unit for storing the coupon numbers corresponding to each of the winning reference numbers, and an instant coupon number generation unit for generating instant coupon numbers by combining the winning reference number, used when the coupon numbers are generated, with the individual coupon numbers, wherein coupons on which the instant coupon numbers are printed are created.

The coupon number generation unit may include a winning reference number loading unit for loading one winning reference number from the stored winning reference numbers so that the numbers are not duplicated, a winning group number generation unit for receiving the winning reference number from the winning reference number loading unit, and generating a winning group number indicating a group of a group number to be used to check winning of winning numbers to be generated, a winning number generation unit for generating the winning numbers using group numbers corresponding to a group of the winning group number generated by the winning group number generation unit with respect to each of the group numbers of the winning reference number, and a combination unit for generating the coupon numbers by combining the winning group number with the winning numbers.

The coupon number generation unit may arrange the winning group number on a leftmost side and arrange each winning number on a right side of the winning group number.

A method of creating coupons for free gift presentation according to the present invention to accomplish the above object includes a winning reference number generation step of generating and storing winning reference numbers, each composed of a plurality of group numbers that each include a plurality of different one-digit numbers, a coupon number generation step of generating coupon numbers including both winning numbers, generated using one of the group numbers for each of the stored winning reference numbers, and a winning group number having information about the group number, an instant coupon number generation step of generating instant coupon numbers by combining the winning reference number generated when the coupon numbers are generated with individual coupon numbers, and a coupon creation step of printing the instant coupon numbers on coupons, and then creating the coupons.

The coupon number generation step may include a winning reference number loading step of loading one winning reference number from the stored winning reference numbers so that the numbers are not duplicated, a winning group number generation step of generating a winning group number having group information of a group number to be used to check winning of winning numbers to be generated using random group numbers of the loaded winning reference number, a winning number generation step of generating winning numbers using group numbers of the group indicated by the winning group number, and a coupon number generation step of generating coupon numbers by combining the winning group number with the individual winning numbers.

The coupon numbers may be configured such that the winning group number is arranged on a leftmost side and each winning number is arranged on a right side of the winning group number.

The present invention is advantageous in that an instant coupon number is primarily converted into and displayed as a barcode, and the coupon number itself is secondarily encrypted and printed, thus preventing the coupon number from being exposed to a third party.

Further, the present invention is advantageous in that a user can immediately check whether he or she has a winning coupon number using a smart phone, on which an application program enabling the encrypted coupon number to be recognized according to the present invention is installed, without accessing a corresponding site using a computer.

Furthermore, the present invention is advantageous in that winning number information indicating whether the coupon number of the corresponding coupon is a winning number is encrypted, thus preventing a third party from visually checking whether the coupon is a winning coupon.

DETAILED DESCRIPTION OF THE INVENTION

Hereinafter, an apparatus and method for creating coupons for free gift presentation according to the present invention will be described.

Figure 1:
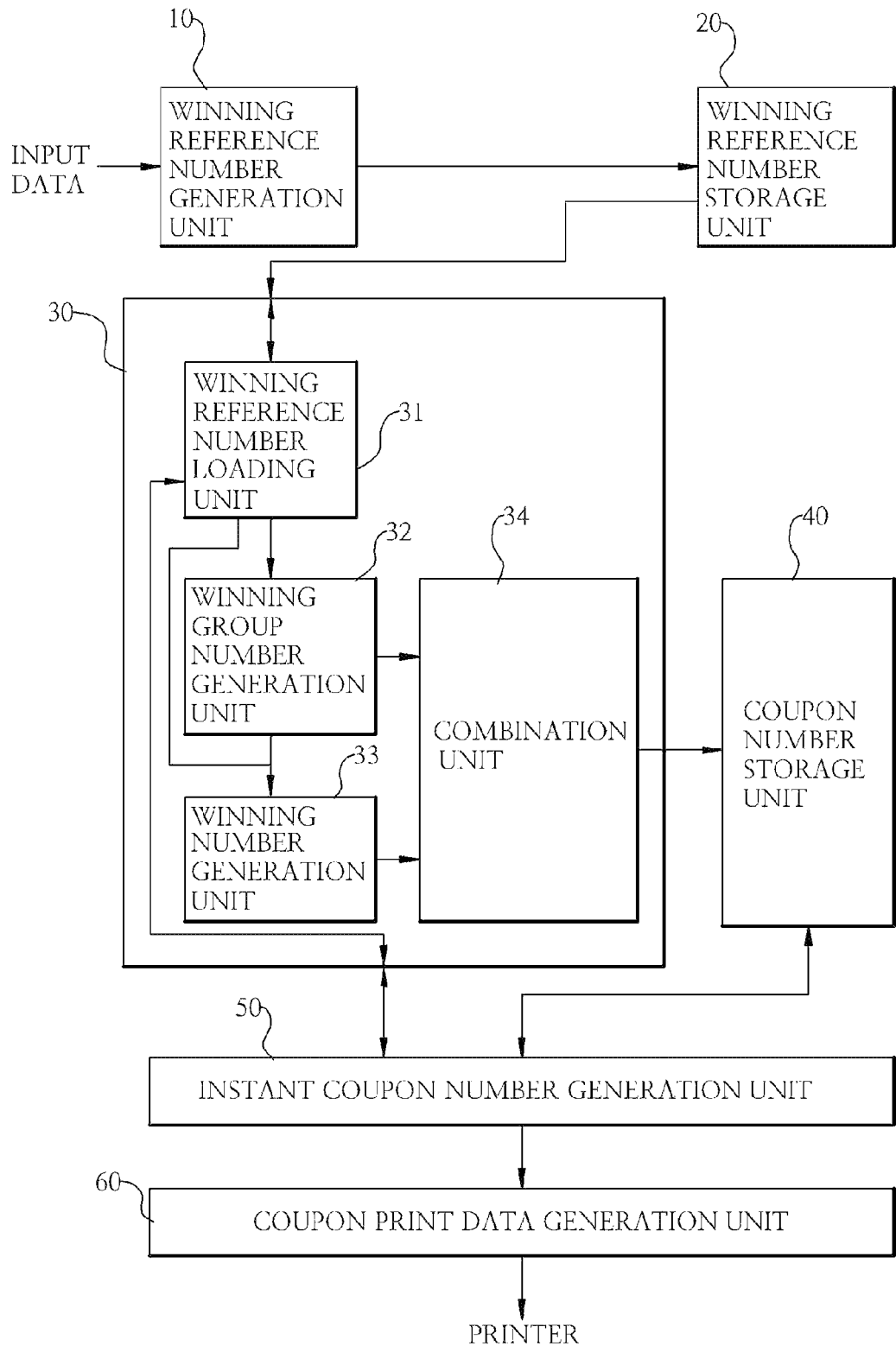
FIG. 1 is a block diagram showing an apparatus for creating coupons for free gift presentation according to the present invention.
Figures 4, 5:
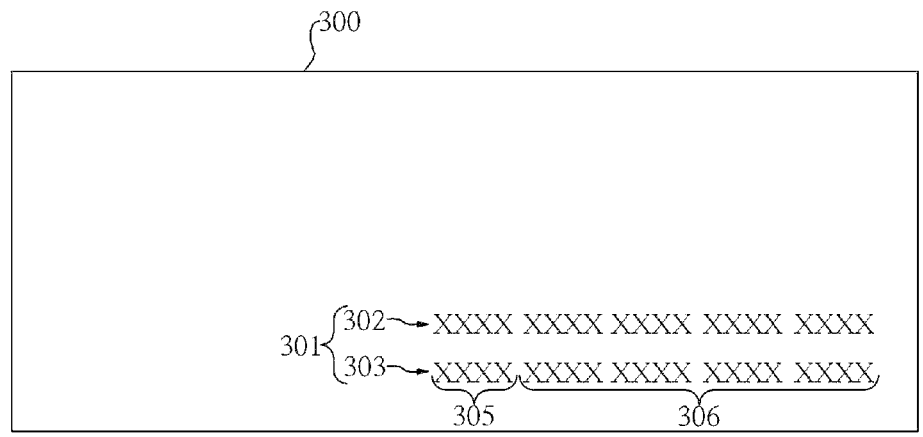
FIG. 4 is a diagram showing one surface of a coupon generated according to the present invention.
FIG. 5 is a diagram showing a winning number generation method according to the present invention.

FIG. 1 is a block diagram showing an apparatus for creating coupons for free gift presentation according to the present invention, FIG. 4 is a diagram showing one surface of a coupon generated according to the present invention, and FIG. 5 is a diagram showing a winning number generation method according to the present invention. Below, a description will be made with reference to FIGS. 1, 4 and 5.

An apparatus for creating coupons for free gift presentation according to the present invention includes a winning reference number generation unit 10, a winning reference number storage unit 2, a coupon number generation unit 30, a coupon number storage unit 40, and an instant coupon number generation unit 50.

The winning reference number generation unit 10 receives input data, such as the number of coupons to be output, and then generates winning reference numbers 302, each composed of a plurality of group numbers that each include a plurality of different one-digit numbers. In detail, when there are about ten thousand or more coupons to be output, such a winning reference number 302 is composed of five groups, each including four numbers, as represented by the following Equation 1. Numbers of the respective groups are referred to as group numbers.

winning reference number=$[\{_{10}P_4\},\{_9P_4\},\{_8P_4\},\{_7P_4\},\{_6P_4\}]$ [Equation 1]

As shown in Equation 1, the winning reference number 302 is composed of five groups, and each group is composed of four numbers using permutation. A leftmost group is set to a first group, and a rightmost group is set to a fifth group in the present invention. The first group is composed of numbers corresponding to $_{10}P_4$ (10 permutation 4), and a second group, a third group, a fourth group, and a fifth group are composed of numbers corresponding to $_9P_4, _8P_4, _7P_4,$ and $_6P_4$, respectively. For example, $_{10}P_4$ denotes group numbers implemented as four numbers that are selected from among 10 numbers of 0, 1, 2, ..., 9 without duplication of numbers, and that are sequentially arranged. Therefore, in the first group, 5040 group numbers are generated, in the second group, 3024 group numbers are generated, in the third group, 1680 group numbers are generated, in the fourth group, 840 group numbers are generated, and in the fifth group, 360 group numbers are generated. In the above example, the case where four numbers are selected from among 10, 9, 8, 7 or 6 numbers and are arranged has been described, but the present invention is not limited to this example.

The winning reference number storage unit 20 stores a plurality of winning reference numbers 302 generated by the winning reference number generation unit 10. For example, when the winning reference number 302 is composed of five groups and is given by Equation 1, the total number of generated winning reference numbers 302 may be 5040*3024*1680*840*360. Even if the number of winning reference numbers generated as described above is excessively large, there is no probability that numbers will be duplicated, so that such a winning reference number is an issued number and is used as an encrypted issued number. That is, the winning reference number storage unit 20 stores 5040*3024*1680*840*360 winning reference numbers 302.

The coupon number generation unit 30 sequentially loads one of the winning reference numbers 302 stored in the winning reference number storage unit 20 without duplicating the numbers, generates winning numbers 306, each composed of group numbers of four groups, using individual group numbers of the loaded winning reference number 302, generates each winning group number 305 indicating a group number used to generate the winning number 306, and generates coupon numbers 303 by combining the winning group number 305 with the winning numbers 306. The winning group number 305 is formed as a single group, as shown in FIG. 4, and is preferably arranged on the left side of the winning number 306 when combination is performed.

In detail, the coupon number generation unit 30 includes a winning reference number loading unit 31, a winning group number generation unit 32, a winning number generation unit 33, and a combination unit 34. The operations of individual components of the coupon number generation unit 30 and a coupon number generation method performed by the components will be described using an example in which a group used to generate a winning number is a first group, and group numbers of the first group are [1, 2, 3, 4].

The winning reference number loading unit 31 sequentially loads one of winning reference numbers 302 from the winning reference number storage unit 20, and provides the loaded winning reference number to the winning group number generation unit 32 and the winning number generation unit 33.

The winning group number generation unit 32 receives the winning reference number 302 from the winning reference number loading unit 31, and generates a winning group number 305 indicating the group corresponding to a group number to be used to check the winning of the winning numbers 306 to be generated. For example, since the group used to generate the winning numbers is a first group, the winning group number 305 must be configured to indicate the first group. Therefore, the winning group number generation unit 32 configures individual numbers of the winning group number 305 so that the numbers satisfy the following Equation 2, thus generating the winning group number 305.

$$\text{winning group} = \text{Remainder}[\text{sum}(a,b,c,d)/10] \quad \text{[Equation 2]}$$

That is, since the winning group is a first group, numbers a, b, c, and d must be determined so that a remainder obtained by calculating (a+b+c+d)/10 becomes 1 and the numbers a, b, c, and d are not duplicated. For example, the numbers a, b, c, and d of the winning group number 305 may be 3, 5, 6, 7 (Remainder [(3+5+6+7)/10]=1), 2, 4, 7, 8(Remainder [(2+4+7+8)/10] =1), or the like.

The winning number generation unit 33 generates winning numbers using the winning reference number 302 and group numbers that can be generated by permutation corresponding to a group corresponding to the winning group number generated by the winning group number generation unit.

When a description is made using the above example, the winning number generation unit 33 arranges 5040 generated group numbers of the first group in a column (hereinafter referred to as a "first column"), randomly shuffles the 5040 group numbers of the first group arranged in the first column and arranges the shuffled group numbers in a column (hereinafter referred to as a "second column") on the right side of the first column, randomly shuffles the group numbers in the first or second column and arranges the shuffled group numbers in a column (hereinafter referred to as a "third column") on the right side of the second column, and randomly shuffles the group numbers in the first or third column and arranges the shuffled group numbers in a column (hereinafter referred to as a "fourth column") on the right side of the third column, thus forming a seed 401. Individual rows of the seed 401 refer to winning numbers. Therefore, the winning number generation unit 33 reads numbers in the seed 401 for each row, and outputs each number as a winning number. Therefore, the winning group number generation unit 32 must output the same winning group number 305 until all of winning numbers 306 of the seed 401 are output.

The combination unit 34 generates coupon numbers 303 by combining each winning group number 305 output from the winning group number generation unit 32 with the winning numbers 306 output from the winning number generation unit 33, and stores the coupon numbers 303 in the coupon number storage unit 40.

The coupon number storage unit 40 stores coupon numbers 303 for one winning reference number 302, and if another winning reference number 302 is newly loaded, deletes the stored coupon numbers and stores coupon numbers 303 for the newly loaded winning reference number 302. However, when the memory capacity of the coupon number storage unit 40 is configured to be large, the coupon number storage unit 40 may be configured such that all winning reference numbers 302 and coupon numbers 303 corresponding to each winning reference number are stored to be mapped to each other.

The instant coupon number generation unit 50 receives each winning reference number 302 from the winning reference number loading unit 31 of the coupon number generation unit 30, sequentially reads coupon numbers 303 stored in the coupon number storage unit 40, and generates and outputs instant coupon numbers 301, as shown in FIG. 4. In this case, the instant coupon number generation unit 50 combines the same winning reference number 302 with all coupon numbers 303 stored in the coupon number storage unit 40, and outputs resulting instant coupon numbers.

The generated instant coupon numbers 301 are provided to a coupon print data generation unit 60.

The coupon print data generation unit 60 combines the individual instant coupon numbers 301 with different types of print data of coupons (text, an image, or the like), generates coupon print data, as shown in FIG. 4, and provides the coupon print data to a printer (not shown) so that coupons are printed.

The coupon creation apparatus according to the present invention may further include a barcode conversion unit (not shown). The barcode conversion unit may convert the winning reference number 302 and the coupon number 303 of each instant coupon number 301 generated by the instant coupon number generation unit 50 into barcodes, generate instant coupon barcode data, and provide the instant coupon barcode data to the coupon print data generation unit 60. In this case, the coupon print data generation unit 60 may generate coupon print data including instant coupon barcode data and text and image data, and provide the coupon print data to the printer.

Figure 2:
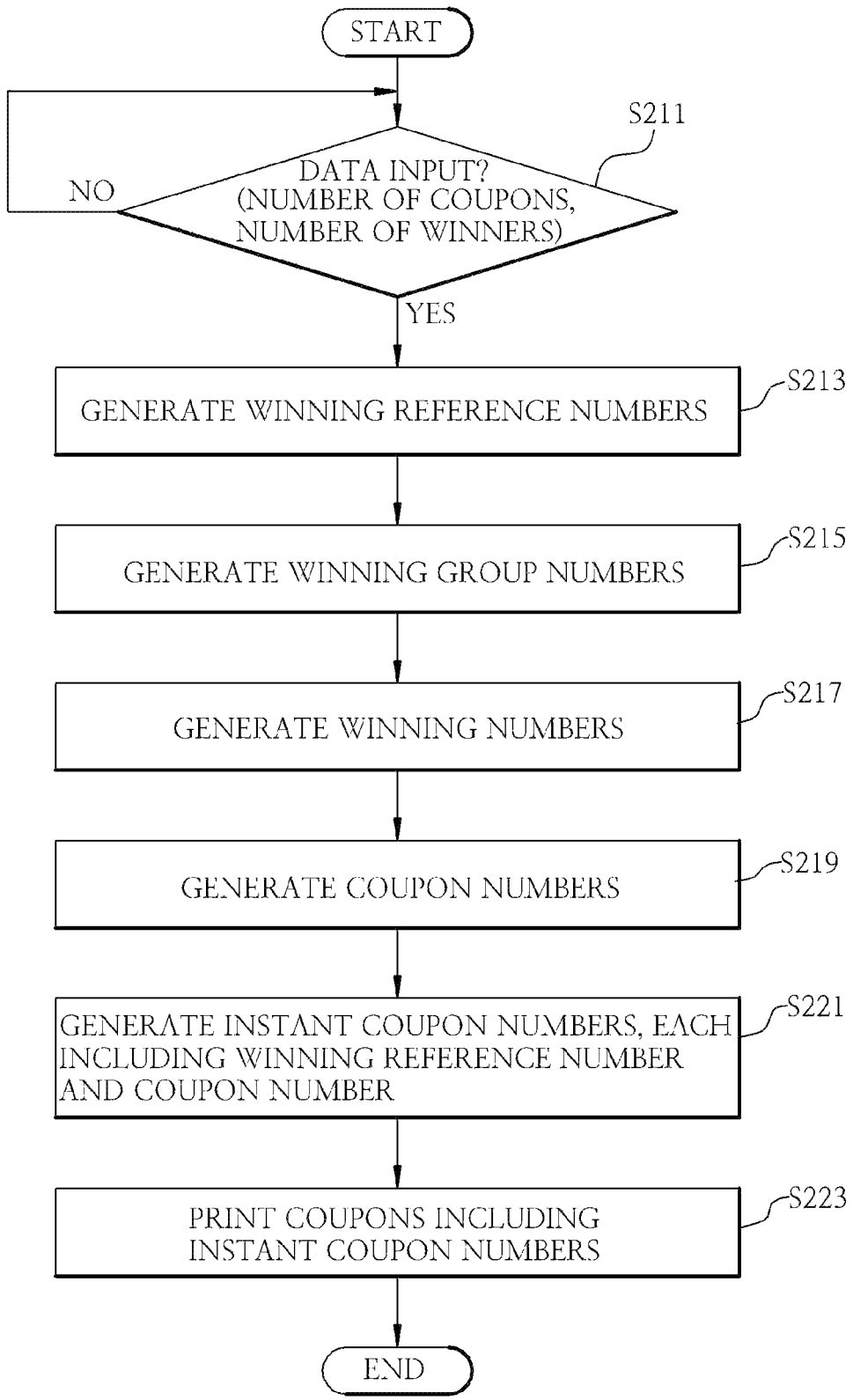
FIG. 2 is a flowchart showing a method of generating coupons for free gift presentation according to the present invention.

FIG. 2 is a flowchart showing a method of generating coupons for free gift presentation according to the present invention.

Hereinafter, a method of generating coupons for free gift presentation according to the present invention will be described with reference to FIGS. 1 to 4.

First, the winning reference number generation unit 10 examines whether input data, such as the number of coupons and the number of winners, has been received (S211).

If the input data has been received, the winning reference number generation unit 10 generates winning reference numbers based on the input data, and stores the generated winning reference numbers in the winning reference number storage unit 20 (S213). For example, where the number of coupons is about ten thousand and the number of winners is 120, winning reference numbers 302 are generated so that 24 winners can come out of a single group and a total of 120 winners can come out with respect to group numbers corresponding to a total of five groups, on the basis of the above Equation 1. As in the case of the above example, when ten thousand coupons are created, only a single winning reference number 302 needs to be generated when the above Equation 1 is used. The reason for this is that a total of 10944 (5040+3024+1680+ 840+360) winning numbers can be generated for a single winning reference number 30 in consideration of the number of winning numbers that can be generated for the first group, that is, 5040, the number of winning numbers that can be generated for the second group, that is, 3024, the number of winning numbers that can be generated for the third group, that is, 1680, the number of winning numbers that can be generated for the fourth group, that is, that is, 840, and the number of winning numbers that can be generated for the fifth group, that is, 360.

When each winning reference number 302 is generated, the coupon number generation unit 30 generates winning group numbers 305 and winning numbers 306 (S215 and S217), and then generates coupon numbers 303 by combining the winning group numbers with the winning numbers 306, thus (S219).

When the coupon numbers are generated, the instant coupon number generation unit 50 generates instant coupon numbers by combining the winning reference number 302 with a plurality of coupon numbers 303 corresponding to the winning reference number 302 (S221).

When the instant coupon numbers are generated, the coupon print data generation unit 60 generates coupon print data including the instant coupon numbers 301 and text and image data, outputs the coupon print data to a printer (not shown), and causes coupons including different instant coupon numbers 301 to be printed (S223). In this case, it is preferable that the instant coupon numbers be converted into barcodes and printed on coupons.

Figure 3:
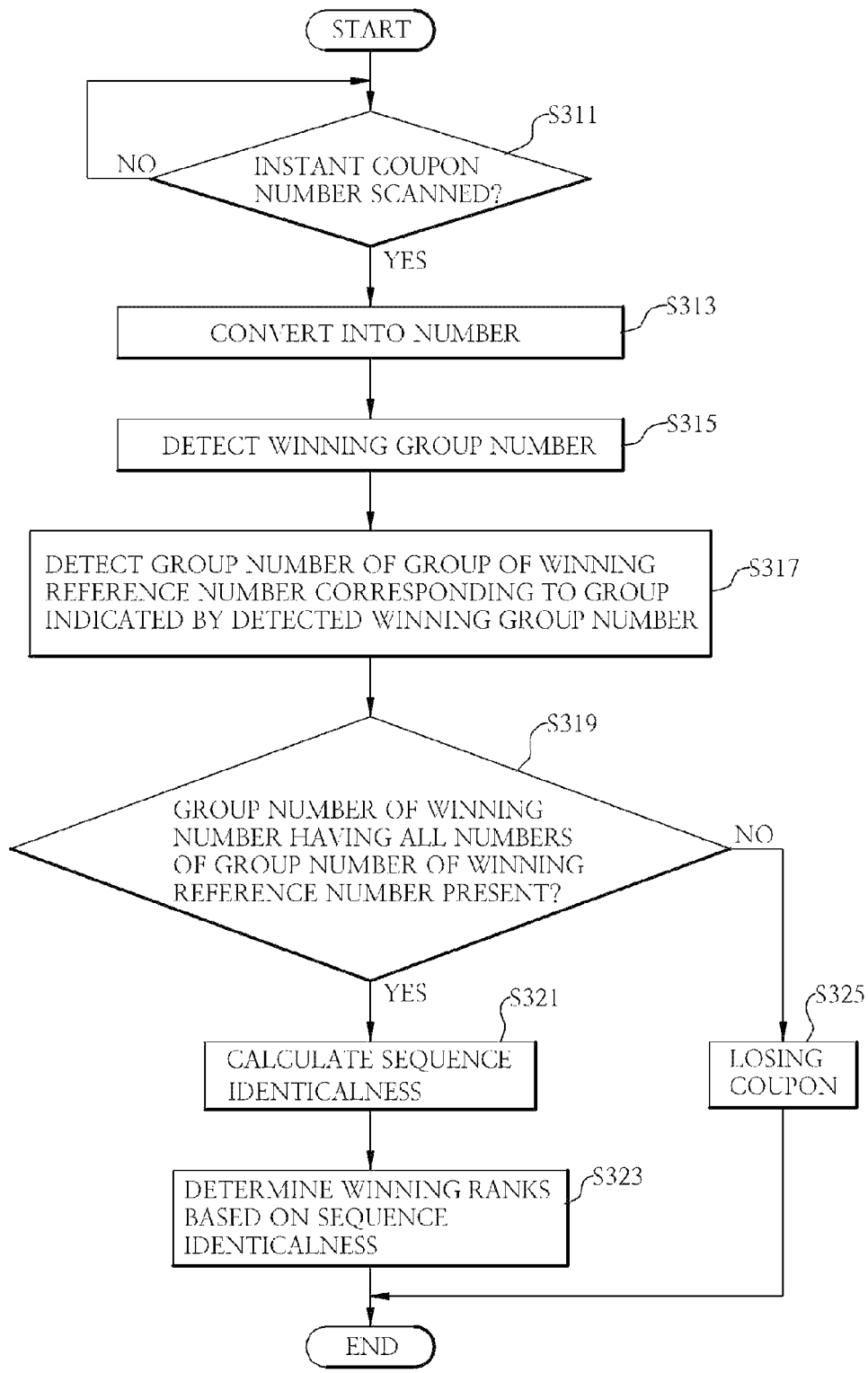
FIG. 3 is a flowchart showing a method of checking whether a coupon for free gift presentation is a winning coupon according to the present invention.

FIG. 3 is a flowchart showing a method of checking whether a coupon for free gift presentation is a winning coupon according to the present invention, wherein the method is described as being performed by a winning checking terminal (not shown), such as a smart phone or an exclusive terminal on which an App (an abbreviation of an application) for checking whether a coupon for free gift presentation is a winning coupon according to the present invention is installed.

Referring to FIG. 3, the winning checking terminal examines whether the instant coupon barcode of a coupon 300 for free gift presentation according to the present invention has been scanned (S311).

If the instant coupon barcode has been scanned, it is converted into an instant coupon number 301 (S313).

If the instant coupon barcode is converted into the instant coupon number 301, the winning checking terminal detects a winning group number 305 from the coupon number 303 (S315), and thereafter calculates a winning group based on the above Equation 2 (S315).

If the winning group has been calculated, the winning checking terminal detects the group number of a winning reference number corresponding to the calculated winning group (S317), and then examines whether any one of group numbers of a winning number 306 includes all numbers corresponding to the detected group number (S319).

If even one of the numbers corresponding to the group number of the winning number is not identical to the numbers of the winning reference number, the winning checking terminal determines the coupon 300 to be a losing coupon (S325), notifies the user of the losing coupon by displaying the losing coupon, and terminates the process.

In contrast, if the numbers corresponding to any group number of the winning number are identical to those of the group number of the winning reference number, the winning checking terminal calculates identicalness in the sequence of the numbers (S321), determines the ranks of winning based on the sequence identicalness (S323), and notifies the user of the ranks by displaying the ranks on a screen. The winning ranks may be configured such that when four numbers among a total of four numbers are identical even in the sequence, the user is determined to be a first prize winner, when three numbers are identical, the user is determined to be a second prize winner, when two numbers are identical, the user is determined to be a third prize winner, and when one number is identical, the user is determined to be a fourth prize winner. Further, winning ranking may also be configured such that when all four numbers are identical, the user is determined to be a first prize winner, and in the remaining cases, the user is determined to be a second prize winner.

Meanwhile, those skilled in the art will appreciate that the present invention is not limited to the above-described typical embodiments, and that various improvements, modifications, additions and substitutions are possible, without departing from the scope and spirit of the invention as disclosed in the accompanying claims. It should be understood that as long as the implementation of improvements, modifications, additions and substitutions fall within the scope of the accompanying claims, the spirit thereof belongs to the scope of the present invention.

DESCRIPTION OF REFERENCE NUMERALS

10: winning reference number generation unit
20: winning reference number storage unit
30: coupon number generation unit
31: winning reference number loading unit
32: winning group number generation unit
33: winning number generation unit
34: combination unit
40: coupon number storage unit
50: instant coupon number generation unit
60: coupon print data generation unit

The invention claimed is:

1. An apparatus for creating coupons for free gift presentation, comprising:
a winning reference number generation unit configured for generating winning reference numbers, each of which being composed of a plurality of group numbers, wherein each of the group numbers includes a plurality of different one-digit numbers for different decimal powers;
a winning reference number storage unit configured for storing the generated winning reference numbers;
a coupon number generation unit configured for loading each of the stored winning reference numbers, and generating coupon numbers including both winning numbers generated using one of the group numbers of the loaded winning reference number and winning group information having information about the one of the group numbers;
a coupon number storage unit configured for storing the coupon numbers corresponding to each of the winning reference numbers; and
an instant coupon number generation unit configured for generating instant coupon numbers by combining the winning reference number used when the coupon numbers are generated with individual coupon numbers,
wherein coupons on which the instant coupon numbers are printed are created,
wherein the coupon number generation unit comprises:
a winning reference number loading unit configured for loading one winning reference number from the stored winning reference numbers so that the numbers are not duplicated;
a winning group number generation unit configured for receiving the winning reference number from the winning reference number loading unit, and generating a winning group number to be used to check a winning status of winning numbers to be generated;
a winning number generation unit configured for generating the winning numbers using group numbers corresponding to a group of the winning group number generated by the winning group number generation unit with respect to each of the group numbers of the winning reference number; and
a combination unit configured for generating the coupon numbers by combining the winning group number with the winning number,
wherein the winning reference number generation unit generates a winning reference number composed of five group numbers that are sequentially generated, the respective group numbers being generated by Equation 1, wherein Equation 1 is as follows:

$$\text{winning reference number} = [\{_{10}P_4\}, \{_9P_4\}, \{_8P_4\}, \{_7P_4\}, \{_6P_4\}].$$

2. The apparatus of claim 1, wherein the winning group number generation unit configures the winning group number using random numbers so that a remainder obtained by dividing a sum of individual numbers of the winning group number by 10 indicates a group number having winning information of each winning number.

3. The apparatus of claim 2, wherein the individual numbers are selected so that the sum of the numbers is in the twenties.

4. The apparatus of claim 1, wherein the winning number generation unit arranges group numbers of the group indicated by the winning group number in four columns, wherein group numbers in latter three columns are randomly shuffled and are rearranged, and thereafter numbers in individual rows of a rearranged form are generated as winning numbers.

5. The apparatus of claim 1 wherein when the winning group number and the winning numbers are arranged sequentially the coupon number generation unit arranges the winning group number on a first portion of the coupon number and arranges each winning number on a second portion of the winning group number.

6. A method of generating coupons for free gift presentation in a company site using an information processing device, comprising:
a winning reference number generation step of generating and storing winning reference numbers, each of which being composed of a plurality of group numbers in the information processing device, wherein each group number includes a plurality of different one-digit numbers for different decimal powers;
a coupon number generation step of generating coupon numbers including both winning numbers generated using one of the group numbers for each of the stored winning reference numbers and a winning group number having information about the one of the group numbers in the information processing device;
an instant coupon number generation step of generating instant coupon numbers by combining the winning reference number generated when the coupon numbers are generated with individual coupon numbers in the information processing device; and
a coupon creation step of printing the instant coupon numbers on coupons, and then creating the coupons using the information processing device,
wherein the coupon number generation step comprises:
a winning reference number loading step of loading one winning reference number from the stored winning reference numbers so that the numbers are not duplicated;
a winning group number generation step of generating a winning group number having group information of a group number to be used to check a winning status of winning numbers to be generated using random group numbers of the loaded winning reference number;
a winning number generation step of generating winning numbers using group numbers of the group indicated by the winning group number; and
a coupon number generation step of generating coupon numbers by combining the winning group number with individual winning numbers,
wherein the winning reference number is composed of five group numbers that are sequentially generated, each of the group numbers being generated so that all numbers a, b, c, d, . . . of the respective group number satisfy Equation 2, wherein Equation 2 is as follows:

winning group=Remainder[sum($a, b, c, d, \ldots$)/10].

7. The method of claim 6, wherein the winning group number is composed of random numbers so that a remainder obtained by dividing a sum of individual numbers of the winning group number by 10 indicates an order of a group number having winning information of each winning number.

8. The method of claim 7, wherein the individual numbers are configured so that the sum of the numbers is in the twenties.

9. The method of claim 6, wherein the winning numbers are numbers of individual rows of a form in which group numbers of each group indicated by the winning group number are arranged in four columns, and in which group numbers in latter three columns are randomly shuffled and rearranged.

10. The method of claim 6, wherein the coupon numbers are configured such that the winning group number is arranged on a leftmost side and each winning number is arranged on a right side of the winning group number.

* * * * *